(12) United States Patent
Hayashi et al.

(10) Patent No.: US 9,091,380 B2
(45) Date of Patent: Jul. 28, 2015

(54) FLUID DEVICE

(75) Inventors: Tatsuya Hayashi, Kyoto (JP); Kazuhiro Oya, Kyoto (JP); Yuji Yamaguchi, Kyoto (JP)

(73) Assignee: HORIBA STEC, Co., Ltd., Kyoto-shi (JP)

( * ) Notice: Subject to any disclaimer, the term of this patent is extended or adjusted under 35 U.S.C. 154(b) by 822 days.

(21) Appl. No.: 12/957,283

(22) Filed: Nov. 30, 2010

(65) Prior Publication Data

US 2011/0126930 A1 Jun. 2, 2011

(30) Foreign Application Priority Data

Nov. 30, 2009 (JP) ................................. 2009-272747
Dec. 25, 2009 (JP) ................................. 2009-296396

(51) Int. Cl.
*F16K 27/00* (2006.01)
*F16L 23/10* (2006.01)

(52) U.S. Cl.
CPC ................ *F16L 23/10* (2013.01); *F16K 27/003* (2013.01)

(58) Field of Classification Search
CPC ................................ F16K 27/003; F16L 39/00
USPC .......... 137/271, 343, 597, 884; 251/148, 151; 285/125.1, 364, 365, 366, 367, 179, 285/180
See application file for complete search history.

(56) References Cited

U.S. PATENT DOCUMENTS

| 5,106,128 | A | * | 4/1992 | Dugast et al. .................... 285/93 |
| 6,012,479 | A | * | 1/2000 | Fukushima et al. .......... 137/271 |
| 6,039,360 | A | * | 3/2000 | Ohmi et al. ...................... 285/61 |
| 6,502,601 | B2 | * | 1/2003 | Eidsmore et al. ............. 137/884 |
| 7,320,339 | B2 | * | 1/2008 | Milburn ......................... 137/884 |
| 2003/0041910 | A1 | * | 3/2003 | Morokoshi et al. ........... 137/884 |
| 2005/0081931 | A1 | * | 4/2005 | Dezso et al. .................. 137/884 |
| 2008/0290658 | A1 | * | 11/2008 | Kimura et al. ................ 285/366 |

FOREIGN PATENT DOCUMENTS

| JP | 08312900 A | 11/1996 |
| JP | 10169881 A | 6/1998 |
| JP | 2001153289 A | 6/2001 |
| JP | 2001-245900 A | 9/2001 |
| JP | 2002089798 A | 3/2002 |
| JP | 2003013921 A | 1/2003 |
| JP | 2008240967 A | 10/2008 |
| JP | 2008-286325 A | 11/2008 |
| JP | 2009204090 A | 9/2009 |
| JP | 2009264587 A | 11/2009 |

* cited by examiner

*Primary Examiner* — Kevin Murphy
(74) *Attorney, Agent, or Firm* — Alleman Hall McCoy Russell & Tuttle LLP

(57) ABSTRACT

In a fluid device composed of vertical and horizontal fluid lines, for a purpose of improving a compact size and of assuring ease of assembly, a plurality of vertical fluid lines are arranged in parallel to each other, and in the fluid device where, between the adjoining vertical fluid lines, a plurality of horizontal fluid lines for connecting them are arranged in parallel, one of the horizontal fluid lines connects pipes by using a flange joint to be fastened with a coupling ring, and the other one connects pipes by using joint pipes.

5 Claims, 20 Drawing Sheets

＃ FLUID DEVICE

TECHNICAL FIELD

The present invention relates to a fluid device such as a gas panel for a material gas supply line of a semiconductor manufacturing apparatus and the like, the fluid device being composed by connecting a plurality of fluid apparatuses and pipes in horizontal and vertical directions. In addition, the present invention relates to a fluid apparatus fixation device for a fluid device used for the semiconductor manufacturing apparatus and the like, wherein the fluid apparatus fixation device is used for fixing a plurality of fluid apparatuses connected by pipes to each other.

BACKGROUND ART

A so-called flange joint is employed for connecting pipes by coupling flange parts provided at end portions of the pipes, and as shown in Patent Literature 1, a type of flange joint is known that includes a coupling ring externally fitted to a facing flange part for pushing an inclined surface provided at each flange part toward a radial direction, compressing to couple the flange parts with a component force in an axial direction caused at the occasion, and arranging the pipes in series. A feature of the flange joint using the coupling ring is to be able to shorten a length in the axial direction as much as possible.

CITATION LIST

Patent Literature

Patent Literature 1: JP2008-286325A

SUMMARY

Technical Problem

Accordingly, the inventors studied a device using this type of flange joint in a fluid device having fluid lines in horizontal and vertical directions, the device, for example, being used in a material gas supply of a semiconductor manufacturing apparatus. That is the device having the configuration shown in FIG. 1. Comparing the device to the device shown in FIG. 2 using a screw type pipe joint, it can be found that the configuration can be very compact in size by using the flange joint.

Especially, as shown in FIG. 1, in the case of a configuration where a fluid apparatus is provided at a vertical fluid line L1, since reduction of a vertical dimension is restricted due to a size of the fluid apparatus, it becomes very important to reduce a horizontal dimension; however, the fluid device in FIG. 1 has a smaller horizontal dimension in comparison with that of the fluid device in FIG. 2, and accordingly has a great merit in this point.

Meanwhile, in FIGS. 1 and 2, reference numeral L1 shows a gas supply line, reference numeral L2 shows a cleaning gas supply line, reference numeral L3 shows an outlet collective line, reference numeral 11 shows a mass flow controller, reference numerals 12 and 13 show a bulb and a pressure sensor, reference numerals 2, 2', and 2" show a flange joint, reference numeral 20, 20' and 20" show a screw type pipe joint, and reference numerals 4, 4', and 4" show a pipe.

However, since the flange joint is able to shortly and tightly couple the pipes, there are problems in that deformation of the pipe is very small and that an allowable range of a dimension error is narrow. This becomes pronounced in the case where the fluid lines are connected in horizontal and vertical directions as shown in FIG. 1.

That is, in the configuration of FIG. 1, it is assumed that there are dimension errors in the mass flow controller and in the pipes extending from the controller and that there is a slight difference of a length in one gas supply line. In that state, when the cleaning gas supply line is connected to each of the gas supply lines, a vertical position gap occurs between the bulbs to which the outlet collective line is connected. However, the position gap cannot be absorbed in deformation of the pipes, and accordingly there may be the situation where the outlet collective line cannot be formed. In the same manner, this may be caused in a case where the outlet collective line is firstly connected.

Accordingly, in the fluid device in which the fluid lines are arranged and connected in horizontal and vertical directions to each other, the present invention intends to solve the problem of the flange joint that an allowable range of the dimension error is narrow and can easily cause a mismatch in the assembly, by utilizing the above-mentioned feature of the flange joint with the coupling ring as much as possible.

Solution to Problem

Specifically, a fluid device according to the present invention includes: a plurality of vertical fluid lines, each vertical fluid line having one or more fluid apparatuses and pipes that are connected in series; and a plurality of horizontal fluid lines, each horizontal fluid line having one or more series-connected pipes, wherein the plurality of the vertical fluid lines are arranged to be fluidically parallel to each other, and wherein between any two adjoining vertical fluid lines, the plurality of horizontal fluid lines for connecting them are arranged to be fluidically parallel, wherein one of the plurality of horizontal fluid lines includes a plurality of series-connected pipes having a flange part at an adjoining end portion; and a coupling ring externally fitted to the adjoining flange part for pressing an inclined surface provided to the flange part in a radial direction and for compressing to connect the flange parts by using a component force in an axial direction generated at the moment, and
wherein another one of the plurality of fluidically parallel horizontal fluid lines is arranged between the pipes of the adjoining vertical fluid lines and includes a pipe connected to the pipes of the vertical fluid lines by joint pipes.

Since the pipe connection due to the joint pipe is fixation (non-disconnectable) realized by welding and the like, there is an inconvenience that the pipe cannot be disconnected after being connected; however, a length of the pipe can be long, and accordingly size errors of the pipe and the fluid apparatus can be allowed by a structural flexure of certain degree, and by adjustment in assembly, reduction of the size can be assured.

Consequently, according to the present invention, since the joint pipe and the flange joint are mixed adequately, the problem depending on rigidity of the flange joint can be solved by flexibility of the joint pipe, with maintenance of ease of the assembly and detaching due to the flange joint, and the configuration can be compact in size at least in the horizontal direction.

To ease a fixing operation due to the welding and the like using the joint pipe, it is preferable that another one of the horizontal fluid lines is configured to be positioned on the endmost side.

On the other hand, there is also a problem described below. A fluid device used in a semiconductor manufacturing apparatus is configured by arranging in parallel a plurality of fluid apparatus groups formed of a plurality of series-connected fluid apparatuses and the like; and connecting adjoining fluid apparatus groups by using connection means and the like. On this occasion, there is a method for fixing the respective fluid apparatuses to a substrate and the like via a lower step member.

As shown in Patent literature 2, a device having a configuration where the fluid apparatus groups are formed on a sub-substrate by: attaching a plurality of the lower step members in series on a long and narrow sub-substrate with screws; and attaching a plurality of fluid apparatuses in series on these lower step members by screws, and the plurality of sub-substrates each on which the fluid apparatus group is formed are attached on one main substrate is known.

Patent literature 2: JP2001-245900A

However, in the above-mentioned configuration, the respective fluid apparatuses and the like are required to be attached with screws one by one in order to fix the respective fluid apparatuses, and accordingly the numbers of parts and process steps are large and cost much time. Meanwhile, in a case of detaching the respective fluid apparatuses, it is also required to remove the screws of the respective fluid apparatuses and the like one by one, and accordingly cost much time as well. Moreover, since the fixation and detaching of the respective fluid apparatuses are complicated, addition and change of the fluid apparatus groups also will be complicated.

In addition, it is required not only to fix the respective fluid apparatuses on the substrate and the like but also further to connect the pipe between the fluid apparatuses. However, the fluid apparatus fixed via the lower step member cannot be moved, and adjustment of the position of the fluid apparatus will be hard due to the pipe connection of the fluid apparatuses.

Consequently, in order to solve the above-mentioned problem, the present invention mainly intends to provide a fluid apparatus fixation device able to easily attach and detach the fluid apparatus, to easily change and add the fluid apparatus group, and to adjust a position of the fluid apparatus due to the pipe connection.

That is, the fluid apparatus fixation device according to the present invention is a fluid apparatus fixation device for fixing a plurality of fluid apparatuses connected by pipes on a base, including: a pedestal member composed of a neck member and a pedestal main body provided below the neck member and attached downward on a bottom surface of the fluid apparatus; a rail member arranged on the base in which a penetrating groove penetrating in a vertical direction is formed; and a biasing mechanism for biasing the rail member or the pedestal member in the vertical direction, wherein in a state where the neck member is inserted in the penetrating groove and where the pedestal main body is inserted between the rail member and the base, while the rail member and the pedestal main body are pressed to fix the pedestal member when the biasing mechanism is operated, the pedestal member can move along the penetrating groove when the operation of the biasing mechanism is released. Meanwhile, a direction vertical to the base is referred to as the vertical direction for convenience, a direction from the fluid apparatus to the base is a downward direction, and the vertical direction may be converted into a horizontal direction, may be converted into an oblique direction, and may be reversed, depending on a use state.

In this configuration, since the pedestal member can move along the penetrating groove when the operation of the biasing mechanism is released, each of the fluid apparatuses and the whole of the plurality of fluid apparatuses connected with pipes are both able to be moved along the penetrating groove, and the position of the fluid apparatus can be adjusted due to the pipe connection.

In addition, when the biasing mechanism is operated, the pedestal member can be fixed, and accordingly the fluid apparatus can be easily attached without attaching the respective fluid apparatuses with screws one by one. On the other hand, when the operation of the biasing mechanism is released, the pedestal member can be moved, and accordingly the fluid apparatus can be moved and easily detached without removing the screws of the respective fluid apparatuses and the like one by one. Consequently, the fluid apparatus can be easily changed and added.

The rail member may be provided to be movable upward and downward, and the pedestal main body may be sandwiched and pressed between the rail member and the base when the biasing mechanism biases the rail member toward the base.

An insert hole with a size where the pedestal main body can be inserted upward and downward may be provided on a plurality of positions of the rail member, and the insert hole may be continued to the penetrating groove. In this configuration, since the pedestal main body can be inserted in the insert hole, only the fluid apparatus to be changed can be attached and detached under a condition where the fluid apparatus not to be changed is kept in the attached state.

To ease the moving more, it is desirable that the pedestal main body includes a rolling body for rolling on the base.

To resist the moving at fixation, it is desirable that a surface of the base is configured to be elastically-deformable.

Advantageous Effects of Invention

According to the present invention, since a pipe connection realized by a joint pipe allows a dimension error of a pipe and the like, the problem depending on rigidity of the flange joint can be solved by flexibility of the joint pipe, thereby maintaining ease of the assembly and detaching due to the flange joint, and the configuration can be compact in size at least in a horizontal direction.

In addition, according to the present invention, a fluid apparatus can be easily attached and detached, a group of the fluid apparatus can be easily changed and added, and additionally in both of the respective fluid apparatuses and a whole of the plurality of fluid apparatuses connected by the pipes, a position of the fluid apparatus can be adjusted due to the pipe connection.

DESCRIPTION OF EMBODIMENTS

Referring to drawings, a first embodiment of the present invention will be explained below.

Figure 1:
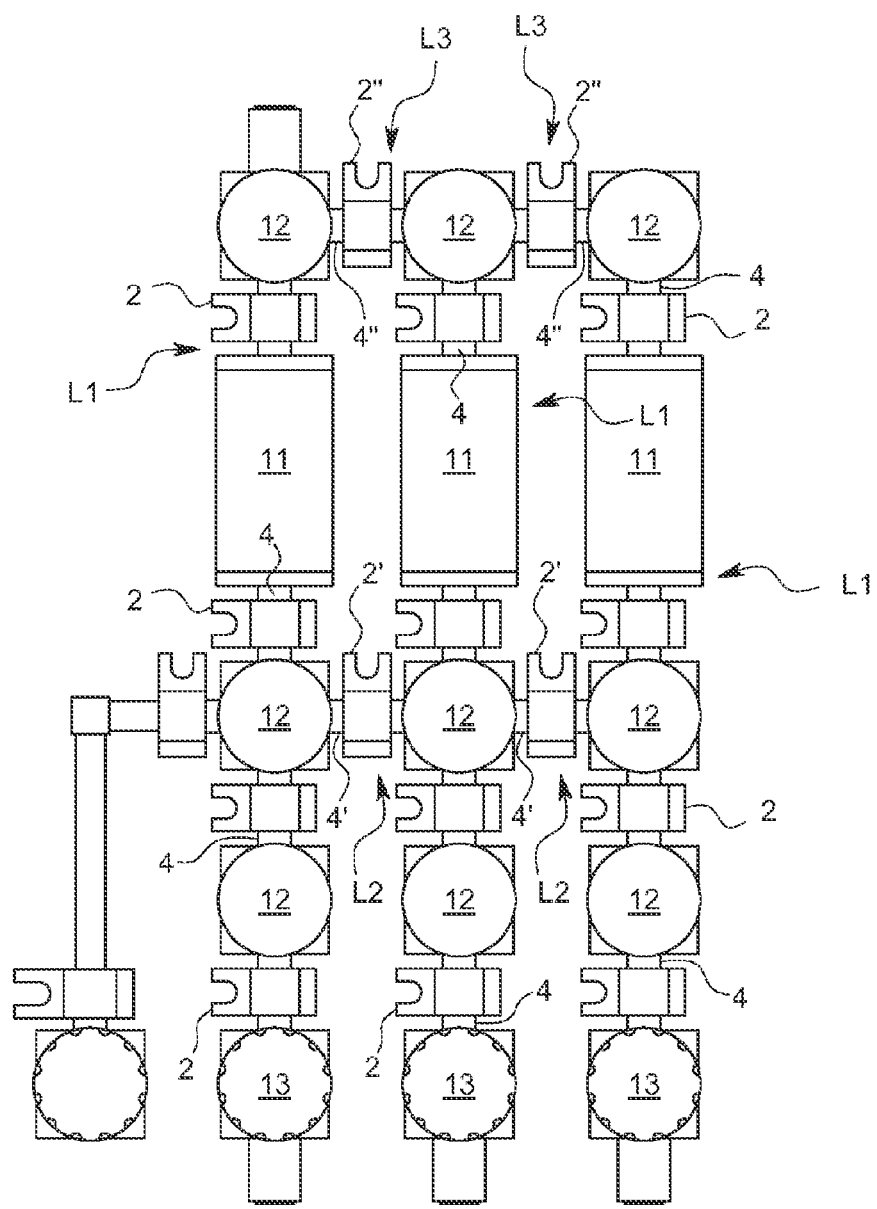
FIG. 1 is schematic configuration view of a conventional fluid device composed by using a flange joint.
Figure 2:
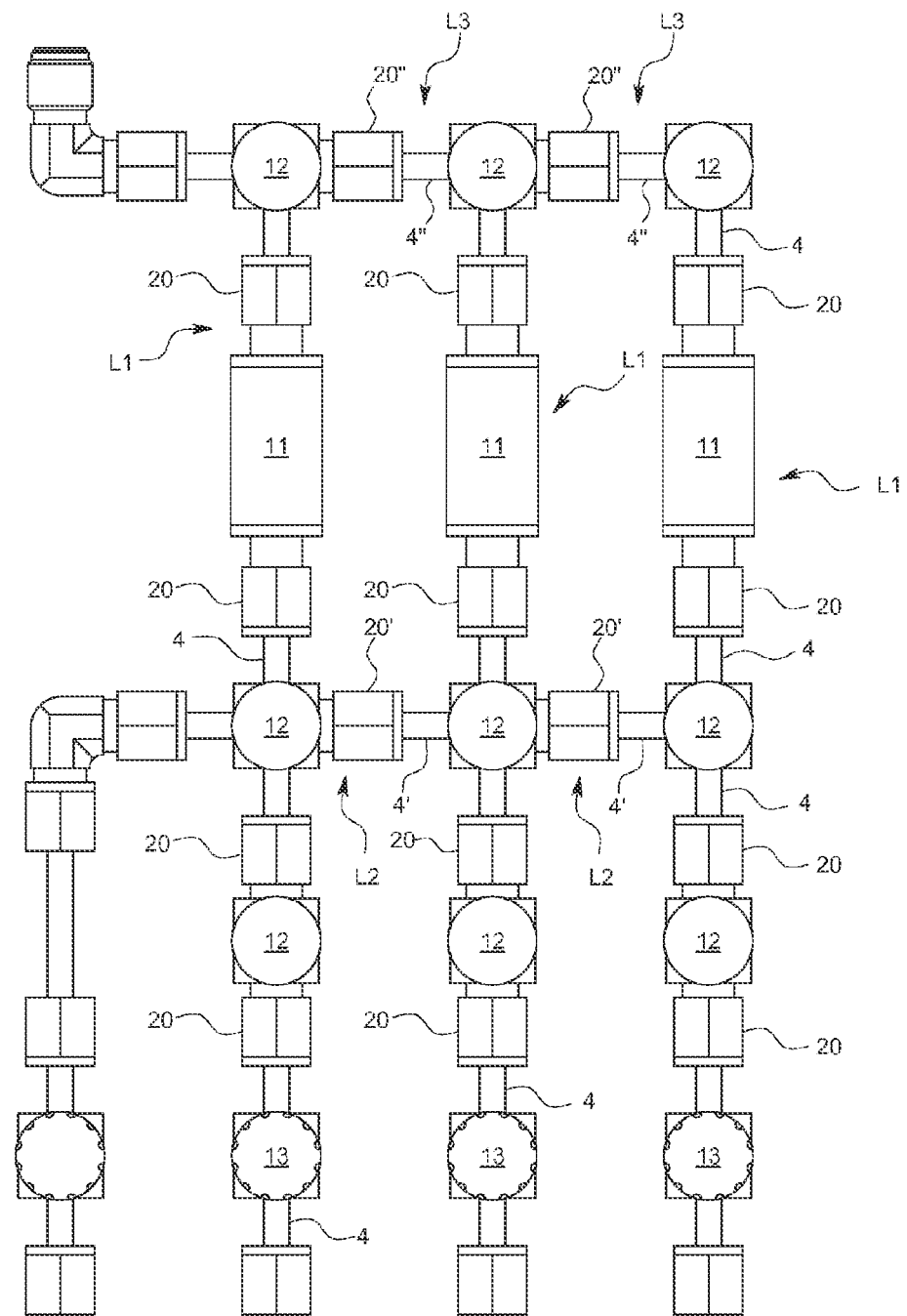
FIG. 2 is schematic configuration view of a conventional fluid device composed by using a screw type pipe joint.
Figure 3:
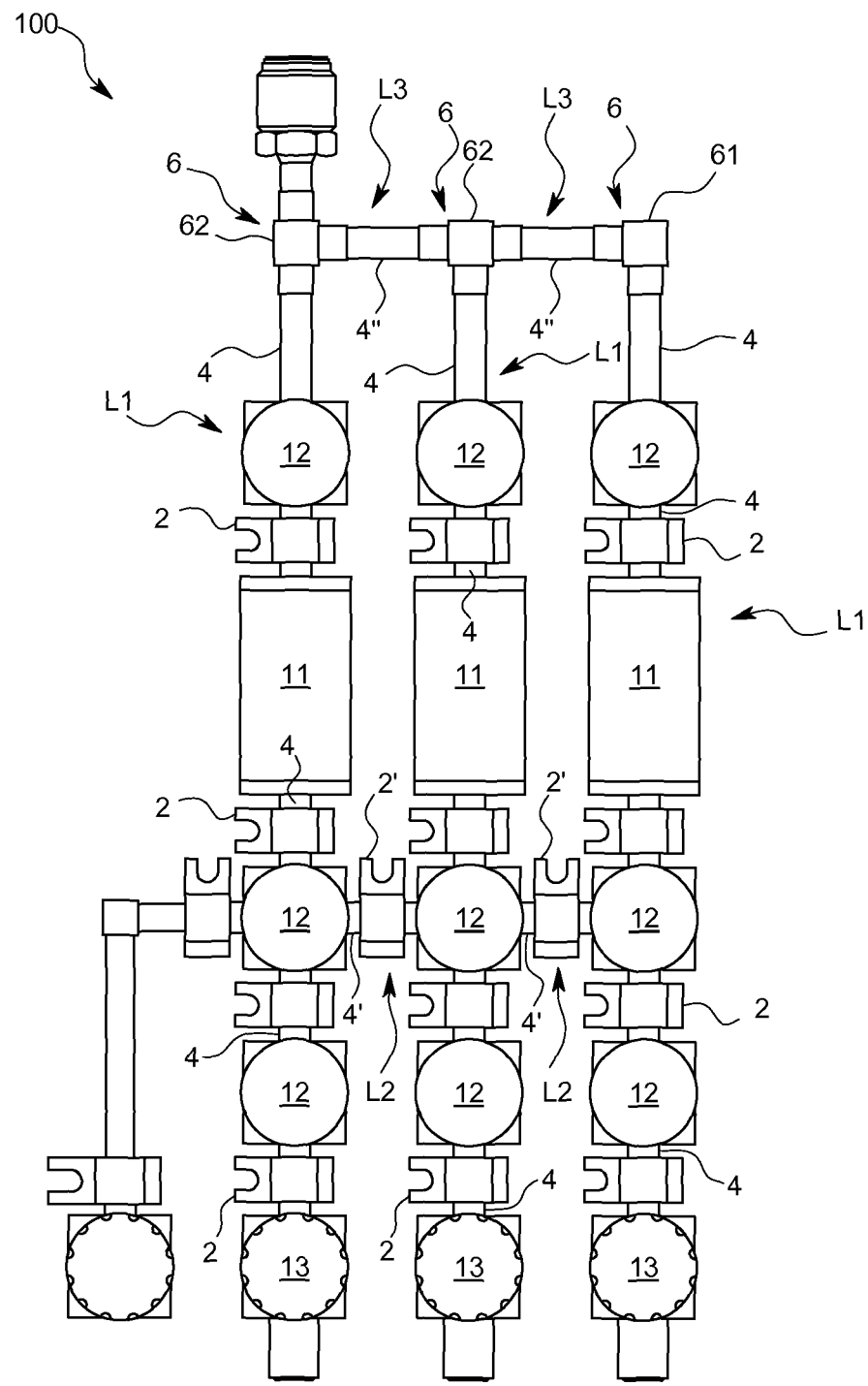
FIG. 3 is a configuration view of a fluid device in a first embodiment of the present invention.

A fluid device 100 according to the present embodiment, as shown in FIG. 3, constitutes a gas-panel type fluid supply device that is a part of a semiconductor manufacturing apparatus.

The gas-panel type fluid supply device (hereinafter simply referred to as a gas panel sometimes) is configured by arranging a plurality of fluid apparatuses in a plane and connecting there-between by pipes. The gas panel here uses a flange joint described below in at least a part of the pipe connection.

Meanwhile, returning to the first embodiment, as shown in FIG. 3, the fluid device 100 according to the present embodiment includes: substantially parallel-provided three gas supply lines L1 that are vertical fluid lines; two horizontal fluid lines provided between these gas supply lines L1, herein a cleaning gas supply line L2 for supplying a cleaning gas to the respective gas supply line L1 and an outlet collective line L3 for unifying outlets of the respective gas supply lines L1.

Next, the respective lines L1 to L3 will be explained.

The gas supply line L1 includes: a plurality of fluid apparatuses 11 to 13; pipes 4 extending integrally from the respective fluid apparatuses 11 to 13; flange joints 2 for connecting the respective fluid apparatuses 11 to 13 by connecting the pipes 4.

As the fluid apparatus, a mass flow controller 11, an opening and closing bulb 12, and a pressure sensor 13 are, for example, shown; however, other fluid control apparatuses, fluid measurement apparatuses, and the like may be employed.

Figure 4:
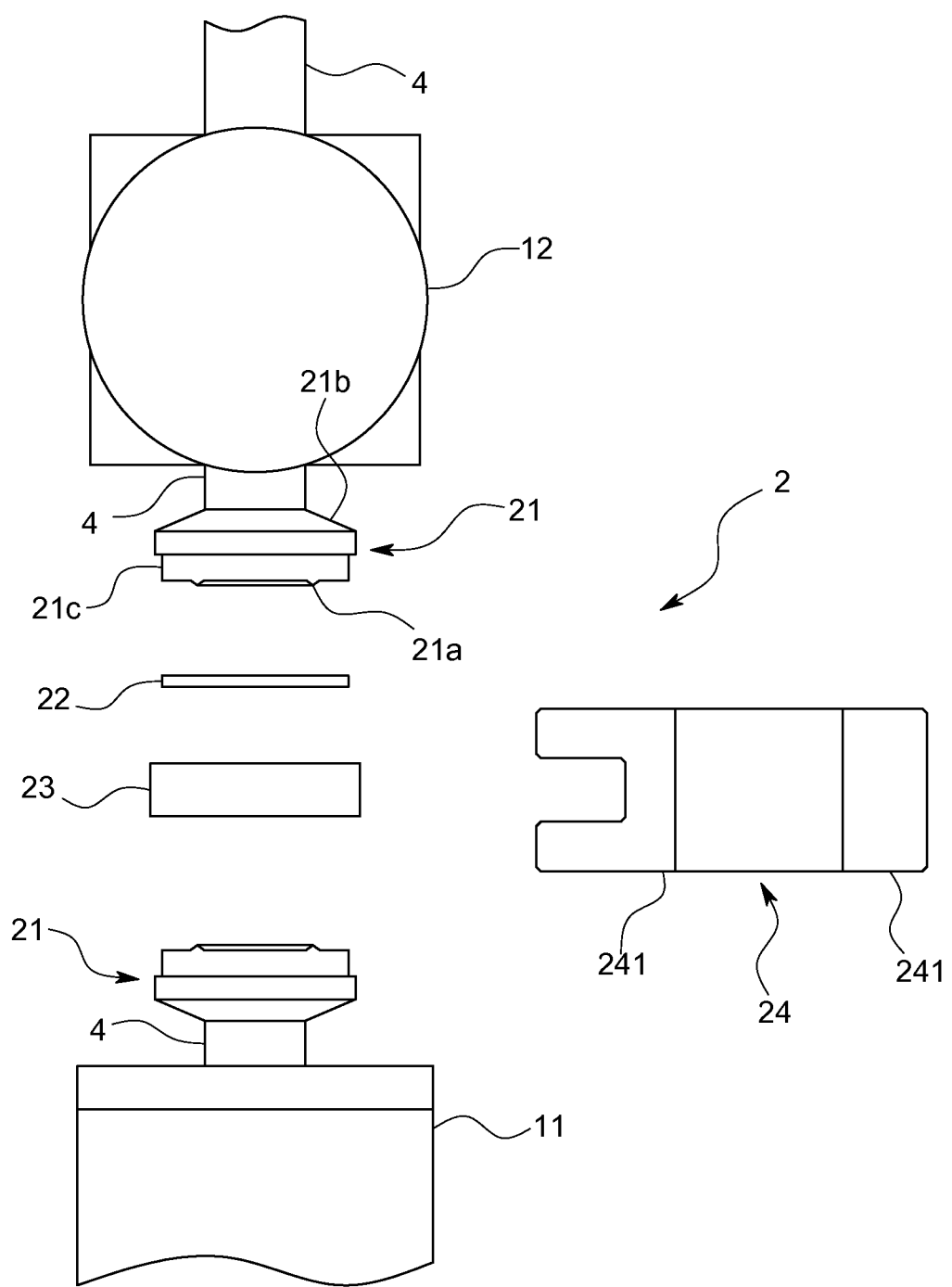
FIG. 4 is a configuration view viewing a flange joint from a planar surface direction in the embodiment.

Especially as shown in FIG. 4, the pipes 4 are preliminarily connected to inlet ports and outlet ports of the respective fluid apparatuses 11 to 13 at the base end, and a flange part 21 described below is provided at the tip portion in a state before the assembly. In addition, pipes with the same diameter are used for all the respective pipes 4 here.

As shown in FIGS. 4 to 8, the flange joint 2 includes: a flange part 21 formed by the welding and the like integrally on a periphery of the tip portion of the pipe 4; a gasket 22 intervening between the flange parts 21 that are faced in order to connect the pipes 4 to each other; a positioning ring 23 for matching the axes of the flange parts 21 to each other; and a coupling ring 24 that is a coupling member for compressing to couple these flange parts 21.

Figure 8:
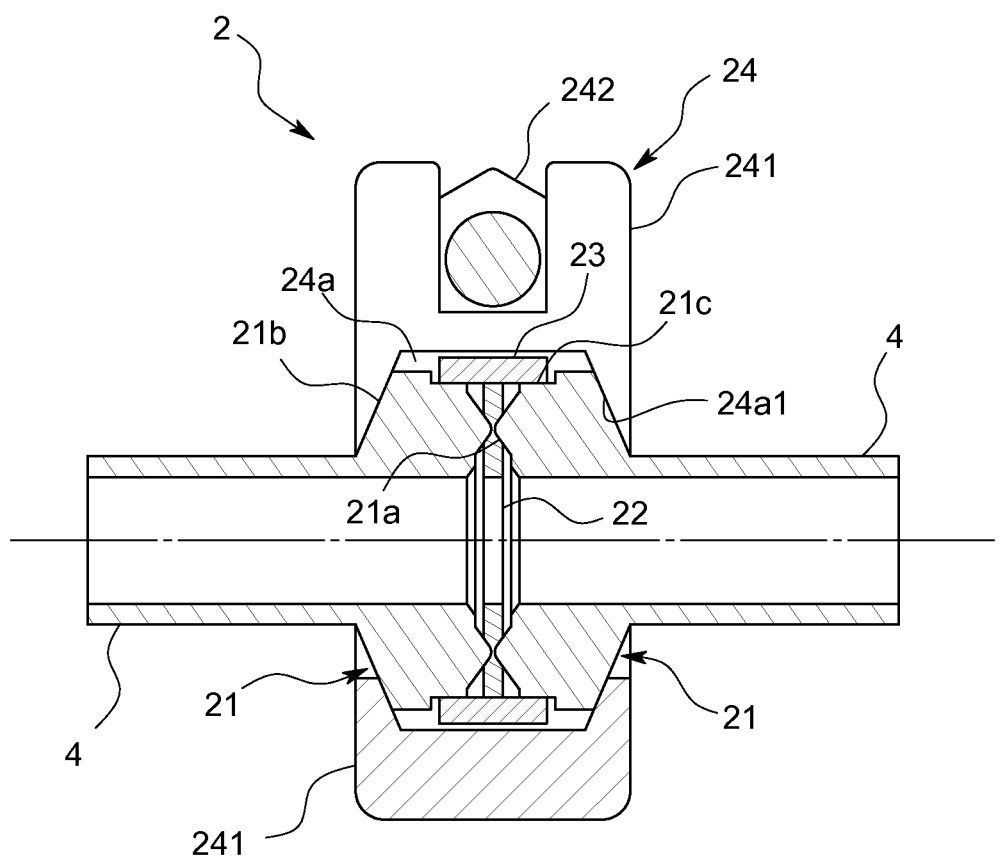
FIG. 8 is a vertical cross-section view of the flange joint in the embodiment.

As shown in FIGS. 4 and 8, the flange part 21 is formed in a circular plate shape, and a convex streak 21a formed in a closed circular shape is provided at the end surface (hereinafter referred to as a lower opposed surface). In addition, an inclined surface 21b inclining in a direction where the diameter is increased toward the end is formed at the reverse surface, and steps are formed in an end portion 21c in the peripheral surface, and thus the external diameter of the end portion 21c is configured to be smaller than other portions.

As shown in FIGS. 4 and 8, the gasket 22 is formed in a thin constant-thickness circular plate shape whose internal diameter is the same as an internal diameter of the pipe 4 and whose external diameter is the same as an external diameter of the flange part end portion 21c.

Figure 5:
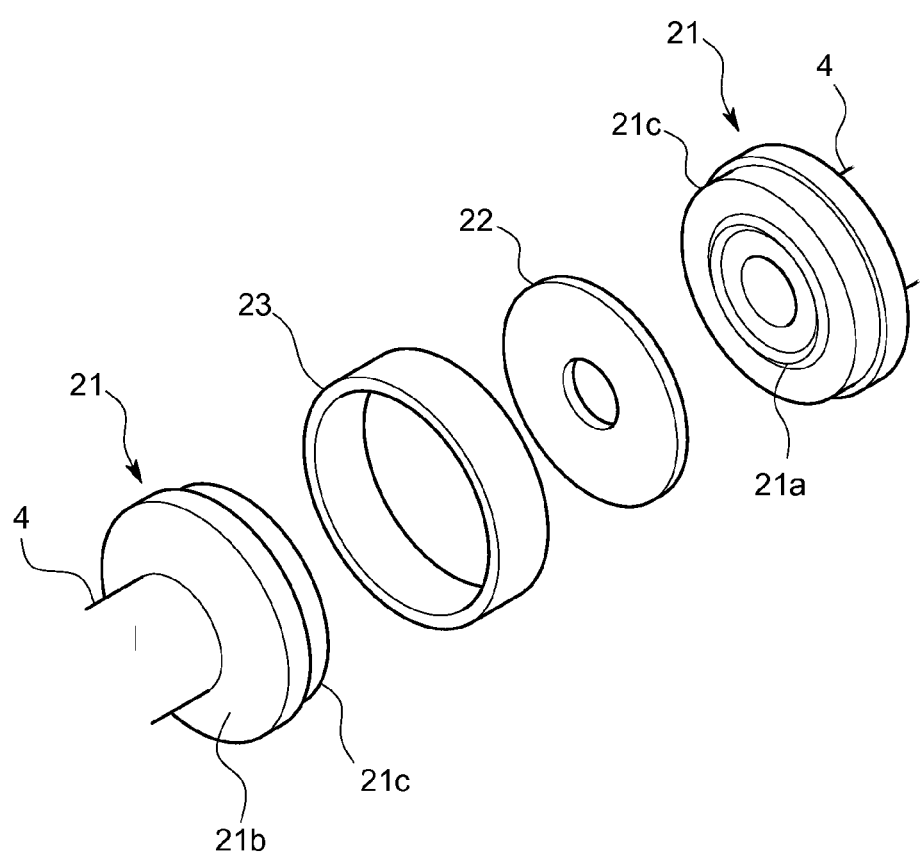
FIG. 5 is an exploded perspective view showing a positioning ring and the like in the embodiment.
Figure 6:
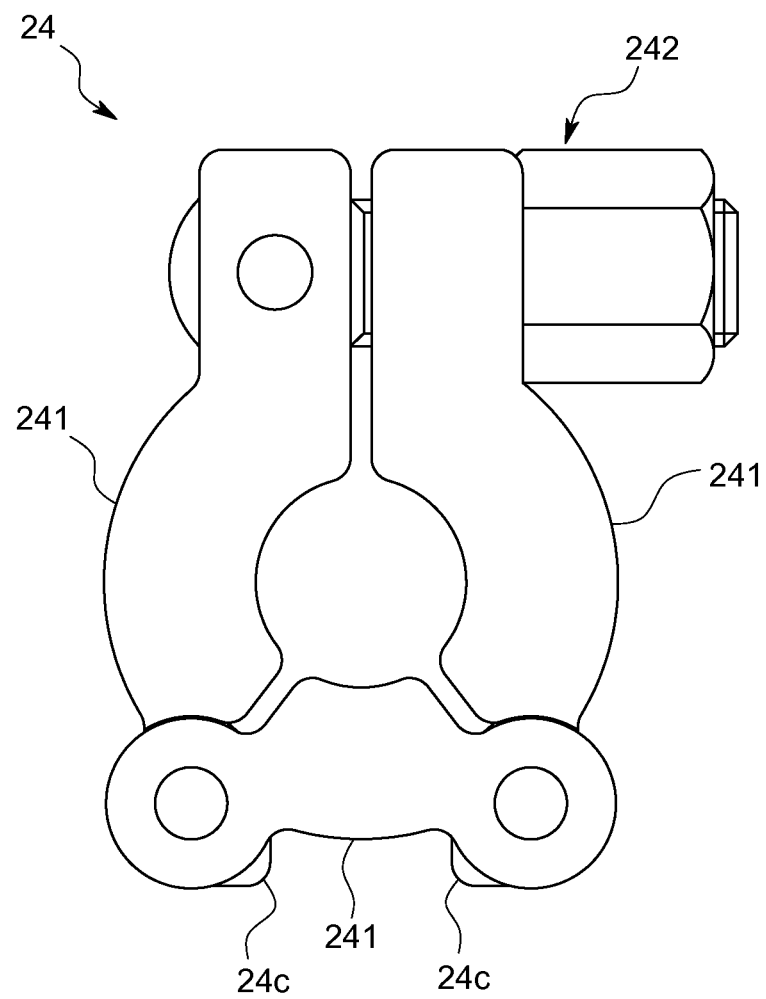
FIG. 6 is a configuration view viewing a coupling ring from an axial direction in the embodiment.
Figure 7:
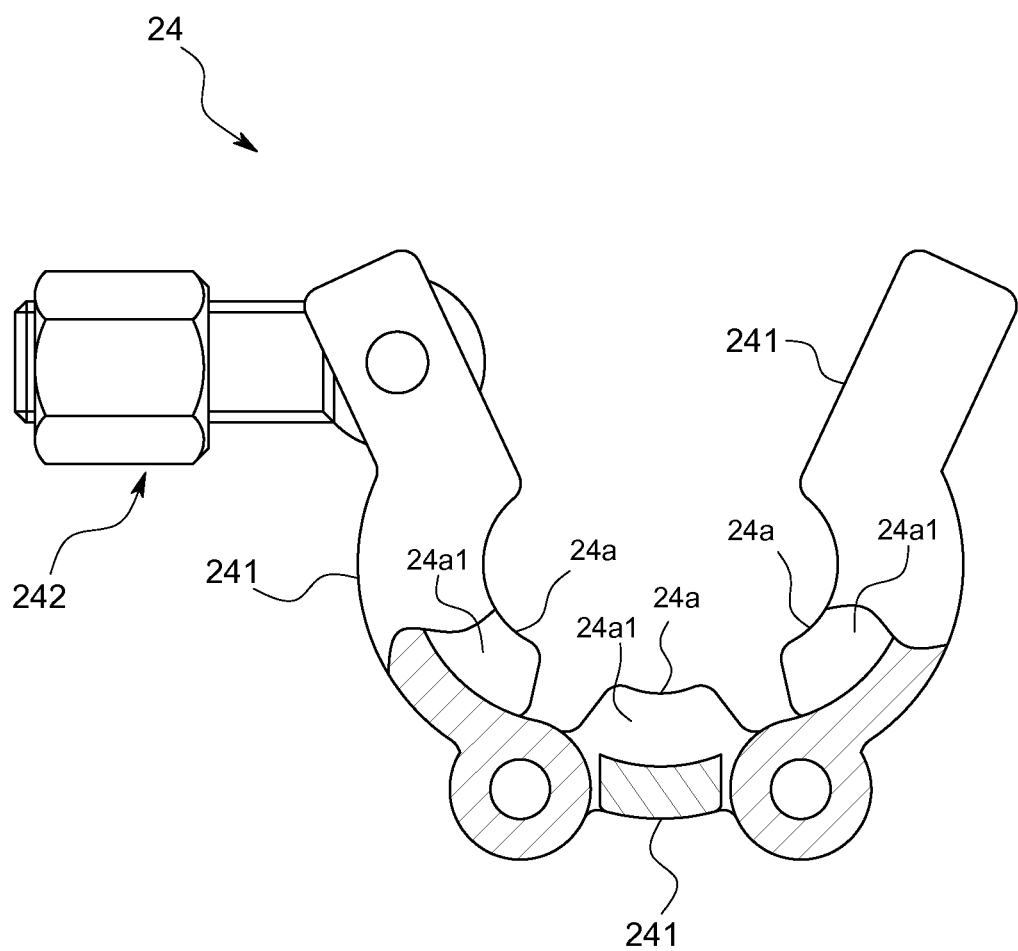
FIG. 7 is a partial cross-section view showing an opening state of the coupling ring in the embodiment.

As shown in FIG. 5, the positioning ring 23 is formed in a cylindrical shape, and is configured by using an elastically-deformable metal. And, an internal diameter of the positioning ring 23 is conformed to the external diameter of the end portion 21c so as to be externally fitted to the flange part end portion 21c free from an extra clearance.

As shown in FIG. 4 and FIGS. 6 to 8, the coupling ring 24 includes: a string of ring parts 241, each rotatably connected to the adjacent ring part; and a fastener 242 for connecting the ring parts 241 at the both ends to be in a circular shape. A bottom fitting groove 24a extending to a circumferential direction is provided at inner circumferential surfaces of the respective ring parts 241 (three parts here). And, an inclined surface 24a1 corresponding to the inclined surface 21b formed on the reverse surface of the flange part 21 is formed on a side surface of the fitting groove 24a.

In connecting the pipes 4 to each other by using the flange joint 2, one end portion of the positioning ring 23 is externally fitted to the flange part end portion 21c provided at one of pipes 4 to be connected at first. Next, the gasket 22 and the flange part end portion 21c provided at the other one of the pipes 4 are fitted in this order to the other end portion of the positioning ring 23 in an axial direction. As the result, the respective flange parts 21, the gasket 22, and the respective pipes 4 are retained with their central axis conformed.

After that, a part of the opposed and closed flange parts 21 are wrapped by the coupling ring 24 set to be in an opening state where the ring parts 241 on both ends are not connected, and the fitting groove 24a is fitted to the peripheral rim part of the flange part 21. And, the ring parts 241 on both ends of the coupling ring 24 are coupled and fastened by the fastener 242. In this manner, an internal diameter of the coupling ring 24 is reduced, and accordingly the side surface inclined surface 24a1 of the fitting groove 24a presses the reverse surface inclined surfaces 21b of the respective flange parts 21 in a diameter direction. On this occasion, a component force to move the respective flange parts 21 in a direction of each approaching the axial direction is generated by the inclined surface 21b, the flange parts 21 are compressed to each other while the circular convex streak 21a is thrust into the gasket 22 by the component force, and thus the pipes 4 are connected to each other in an air-tight state.

As shown in FIG. 3, the cleaning gas supply line L2 connects the bulbs 12 provided on inlet side of the mass flow controller 11 here among the fluid apparatuses 11 to 13 in the respective gas supply line L1, and includes: a pipe 4' extending integrally from the respective bulbs 12 in a horizontal direction; and a flange joint 2' for connecting the bulbs 12 to each other by connecting the pipes 4' to each other. The structures of the pipe 4' and of the flange joint 2' is the same as those of the gas supply line L1, and accordingly the explanations will be omitted here.

As shown in FIG. 3, an outlet collective line L3 connects the pipes 4 provided to a position closest to the outlets of the respective gas supply lines L1, and includes: a pipe 4'' provided between the respective pipes 4; and a welded type pipe joint 6 for connecting the pipe 4 and the pipe 4''. The welded type pipe joint 6 fits the pipes 4 and 4'' to joint pipes 61 and 62 of an elbow type, a T-shape type, and the like, and welds them to connect the pipes to each other in an air-tight state. Here, the elbow type joint pipe 61 is used in the gas supply line L1 on one end, and the T-shape type joint pipe 62 is used in the other gas supply lines L1.

As described above, in the above-described configuration, the joint pipes 61 and 62 absorb a size error, and accordingly even when there is the size error, the fluid device 100 having the plurality of fluid lines L1 to L3 in the respective horizontal and vertical direction can be configured to be more compact in size and to be easily attached and detached further more by using the flange joints 2 and 2', and especially the size in the horizontal direction can be reduced. In addition, the flange joints 2 and 2' can be easily attached and detached from the radial direction even in a narrow working space, and the length in the axial direction can be reduced as much as possible.

Figure 9:
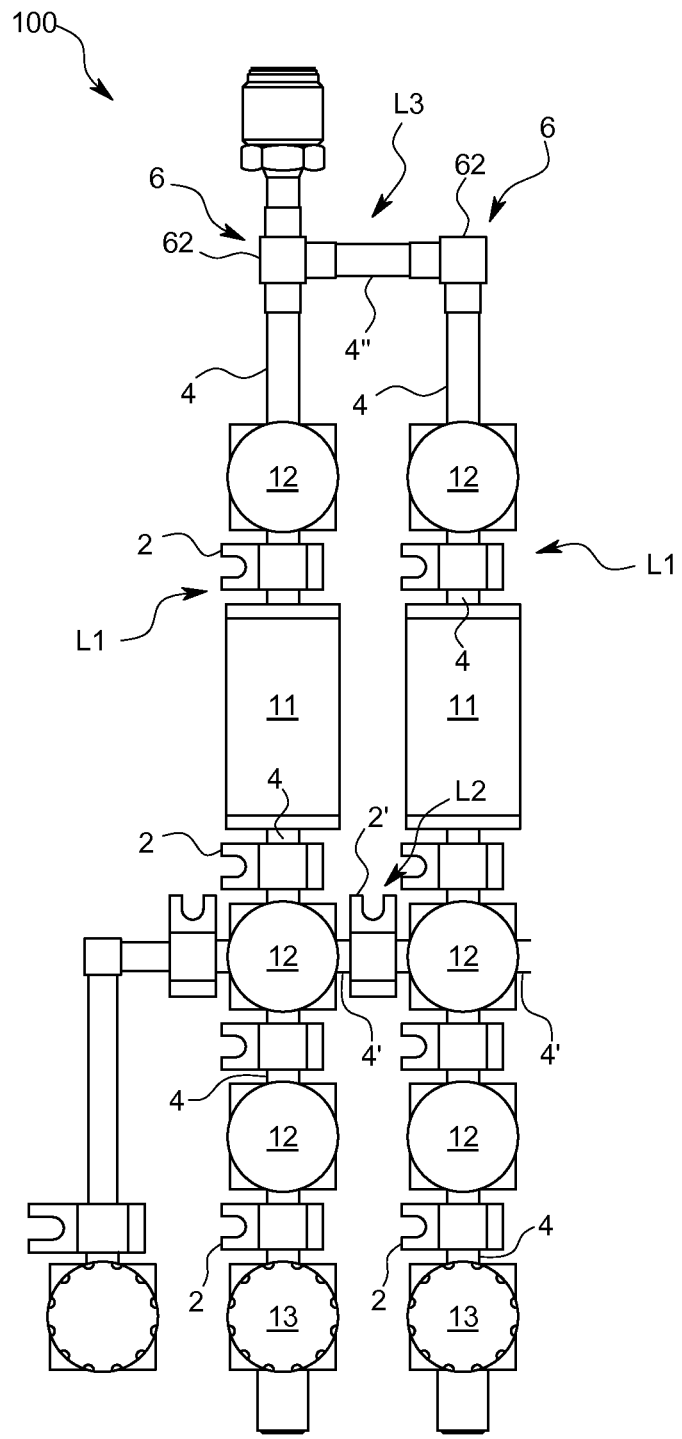
FIG. 9 is a configuration view of a fluid device in another embodiment of the present invention.

Meanwhile, the present invention is not limited to the embodiment. For example, as shown in FIG. 9, the vertical lines L1 may be two, and when the fluid device 100 shown in FIG. 9 is considered as one unit, a configuration where a plurality of the fluid devices 100 are arranged and connected in the horizontal and vertical directions may be employed.

In addition, in the plurality of substantially parallel-arranged horizontal fluid lines for connecting two vertical lines, it is only required that a configuration using the joint pipe and a configuration using the flange joint are combined. That is, for example, in the case where there are more than three vertical fluid lines as shown in FIG. 3, the two horizontal fluid lines L2 (or L3) connected in series are the same type in the drawing; however, one of the two horizontal fluid lines connected in series may use the joint pipe and the other may use the flange joint.

Moreover, the flange joint is not limited to a configuration using the wedge action caused by the inclined surface as shown in the embodiment, and may employ a configuration using other methods such as the screwing.

The fluid may be not only gas but also liquid, and the numbers of the vertical fluid lines and of the horizontal fluid lines are not limited. In addition, the horizontal fluid line may be applied to a configuration having a fluid apparatus other than the pipe and joint. Additionally, the present invention can be variously modified within the scope of the invention.

Referring to the drawings, a second embodiment of the present invention will be explained below.

In order to supply a material gas and the like to a semiconductor manufacturing apparatus for example, a fluid apparatus fixation device X100 according to the present embodiment is used for a so-called gas panel device formed by connecting a plurality of fluid apparatuses X5 in a plane, and as shown in FIG. 10(a), includes: a pedestal member X1 attached to bottom surfaces of the respective fluid apparatuses X5; a rail member X2 for sandwiching the pedestal member X1 with a planar base X22; and a biasing mechanism X3 for biasing the rail member X2 downward to give a force to press the pedestal member X1 toward the base X22. Meanwhile, the fluid apparatus X5 is, for example, a pressure sensor, a mass flow controller, a bulb, and the like here.

Explaining the respective parts, as shown in FIG. 10(a) and so on, the pedestal member X1 includes: a bracket member X10 for attachment to a bottom surface of the fluid apparatus X5; a neck member X11 drooping from a lower surface of the bracket member X10; a body X13 provided sequentially on the lower side of the neck member X11; and a caster X14 that is a rolling body attached to a lower surface of the body X13 in a freely horizontally-rotatable manner. Meanwhile, the body X13 and the caster X14 compose a pedestal main body X12.

The neck member X11 is in a columnar shape, and the body X13 is in a cylindrical shape having a diameter larger than that. That is, when seeing from above, the body X13 is so configured that the outer profile projects toward an outside than that of the neck member X11, and that the projecting upper surface portion is pushed by a lower surface X2a of the rail member X2 as a pressed surface X13a described below.

Figure 10:
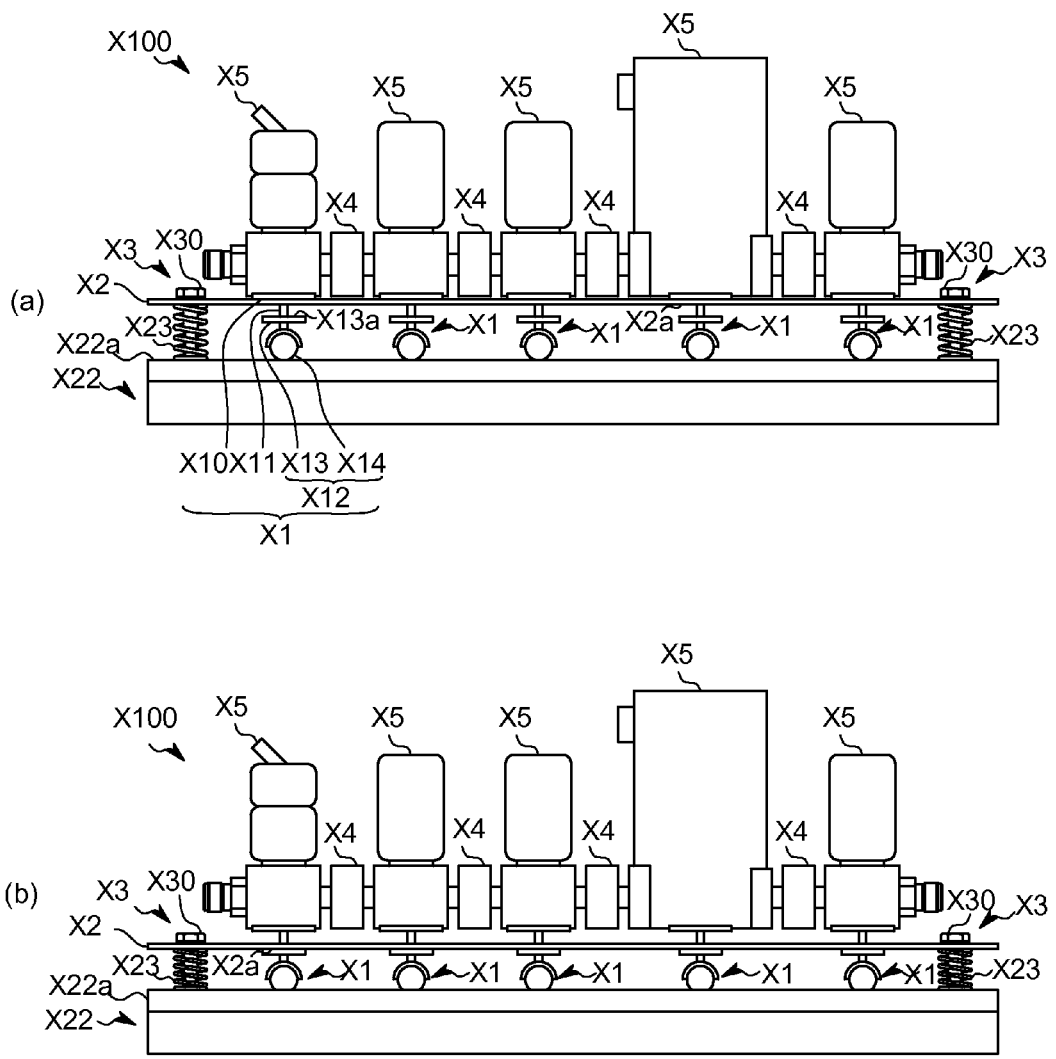
FIG. 10 is a side view showing a fluid apparatus fixation device in a second embodiment of the present invention.
Figure 11:
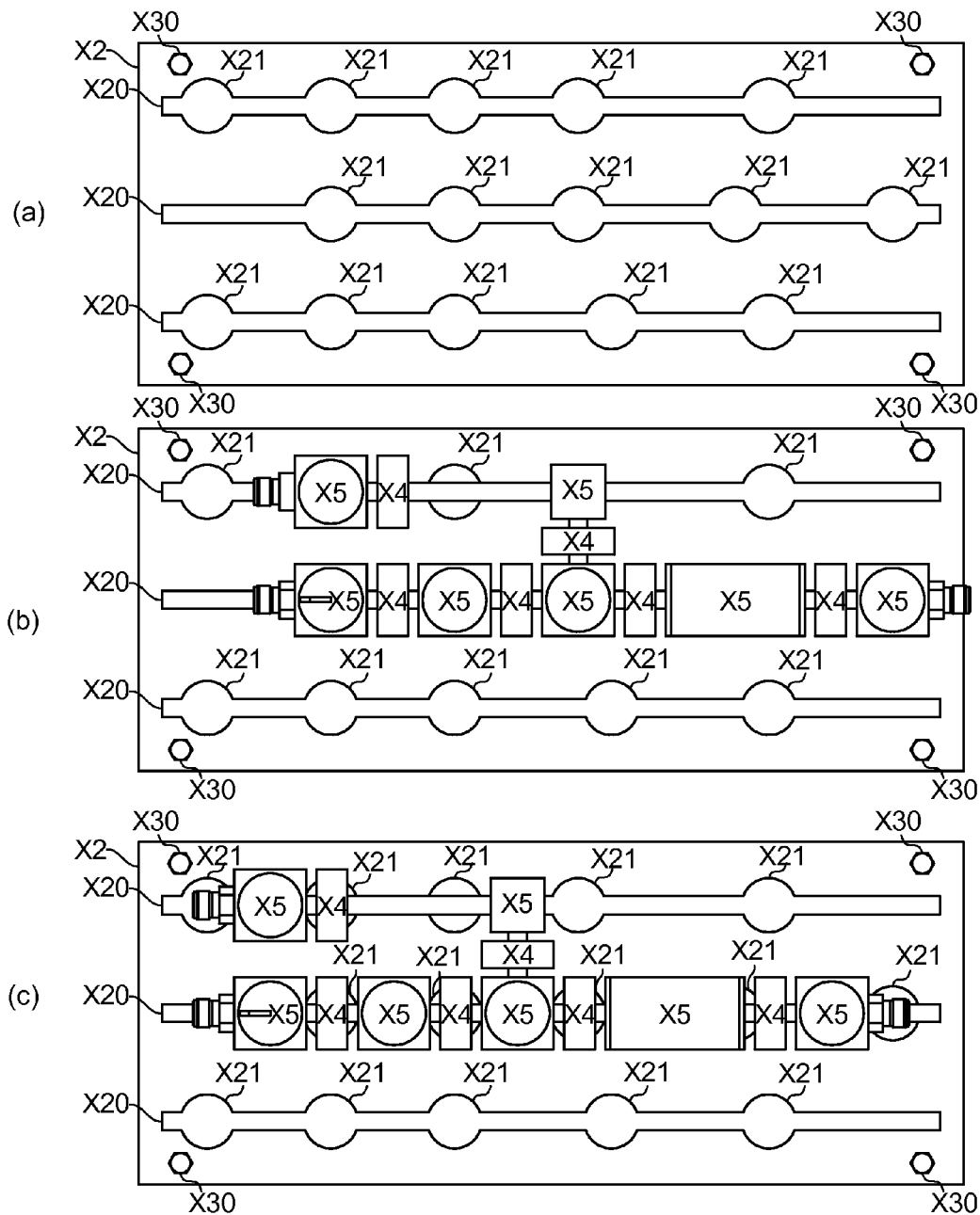
FIG. 11 is a diagram showing a procedure for fixing the fluid apparatus by using the fluid apparatus fixation device in the embodiment.

As shown in FIGS. 10 and 11(a), the rail member X2 is a constant-thickness circular plate shape arranged on the base X22 to be movable upward and downward, and in the present embodiment, a plurality of constant-width linear penetrating grooves X20 (three grooves here) extending along a longitudinal direction are formed. In the rail member X2, circular insert holes X21 are further provided to the penetrating groove X20 sequentially in plural portions (15 portions in total, 5 portions in each penetrating groove X20). While the width of the penetrating groove X20 is set to be smaller than a diameter of the body X13 and to be larger than the thickness of the neck member X11, a diameter of the insert hole X21 has a size allowing the body X13 and the caster X14 to be inserted upward and downward.

As shown in FIGS. 10(a), 10(b), and the like, the biasing mechanism X3, for example, is configured by screwing a bolt X30 penetrating through an end portion of the rail member X2 to a screw hole (not shown in the drawing) provided to the base X22, and biases the rail member X2 downward by fastening the bolt X30 as described above. Moreover, the spring X23 is externally fitted to the bolt X30 so as to wind the bolt. In addition, the biasing mechanism X3 is not limited to the fastening member such as the bolt X30 and the screw hole, and the rail member X2 may be biased downward by using an elastic body such as a spring.

Meanwhile, in the embodiment, the surface X22a of the base X22 is formed on an elastic plate.

Next, using the fluid apparatus fixture device X100 according to the present embodiment, a procedure to fix the fluid apparatus X5 will be explained. At first, a state where an operation of the biasing mechanism X3 is released, that is, a state where the bolt X30 is loosened and the rail member X2 is lifted upward by a force of the spring X23 is prepared (FIG. 11(a)).

Then, the pedestal member X1 attached to a bottom portion of the fluid apparatus X5 is inserted in the insert hole X21 corresponding to the fluid apparatus X5 from above. In the state where the caster X14 is contacted to the base X22, the pedestal main body X12 is placed between the rail member X2 and the base X22, and the neck member X11 is inserted into the insert hole X21. And, as shown in FIG. 11(b), the fluid apparatuses X5 are connected with the pipes by using the pipe joints X4.

Figure 17:
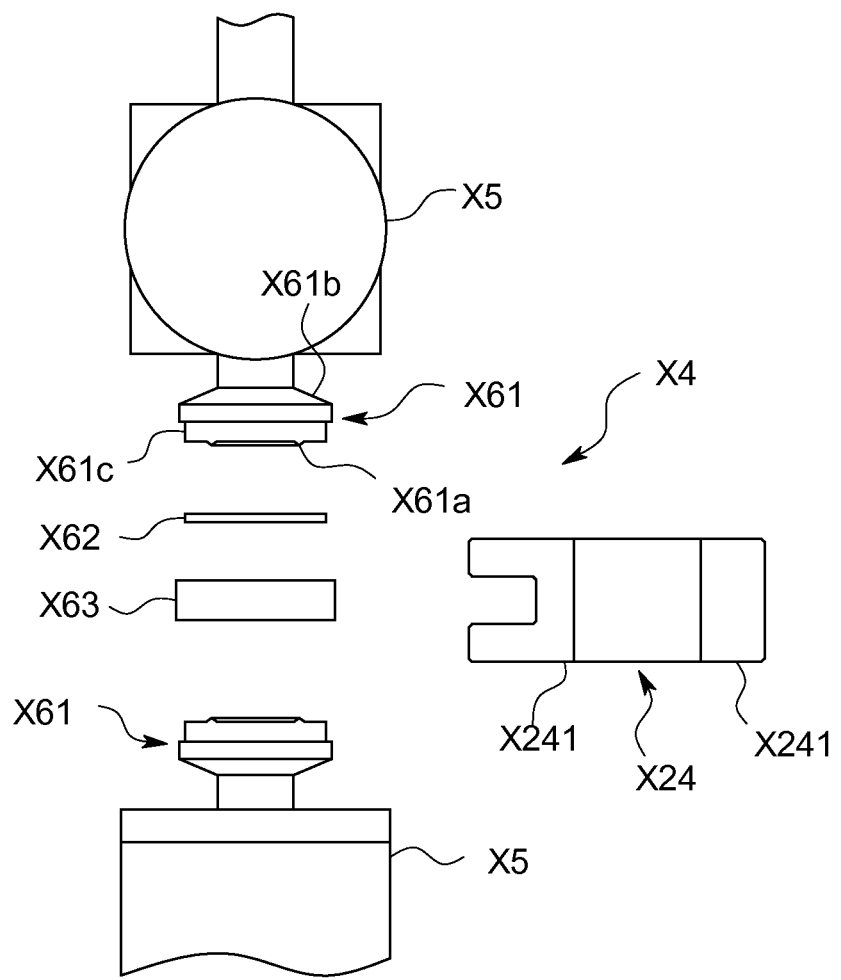
FIG. 17 is a configuration view viewing a pipe joint used in the embodiment from a planar surface direction.

An example of the pipe and pipe joint X4 will be explained. Especially as shown in FIG. 17, the pipe is preliminarily connected to an inlet port and an outlet port of each fluid apparatus X5 at the base end, and the flange part X61 described below is provided to the tip portion in a state before the assembly. In addition, pipes with the same diameter are used for all the pipes here.

As shown in FIGS. 17 to 20, the pipe joint X4 includes: a flange part X61 formed by the welding and the like integrally on a periphery of the tip portion of the pipe X4; a gasket X62 intervening between the flange parts X61 that are faced in order to connect the pipes to each other; a positioning ring X63 for matching the axes of the flange parts X61 to each other; and a coupling ring X24 that is a coupling member for compressing to couple these flange parts X61.

Figure 18:
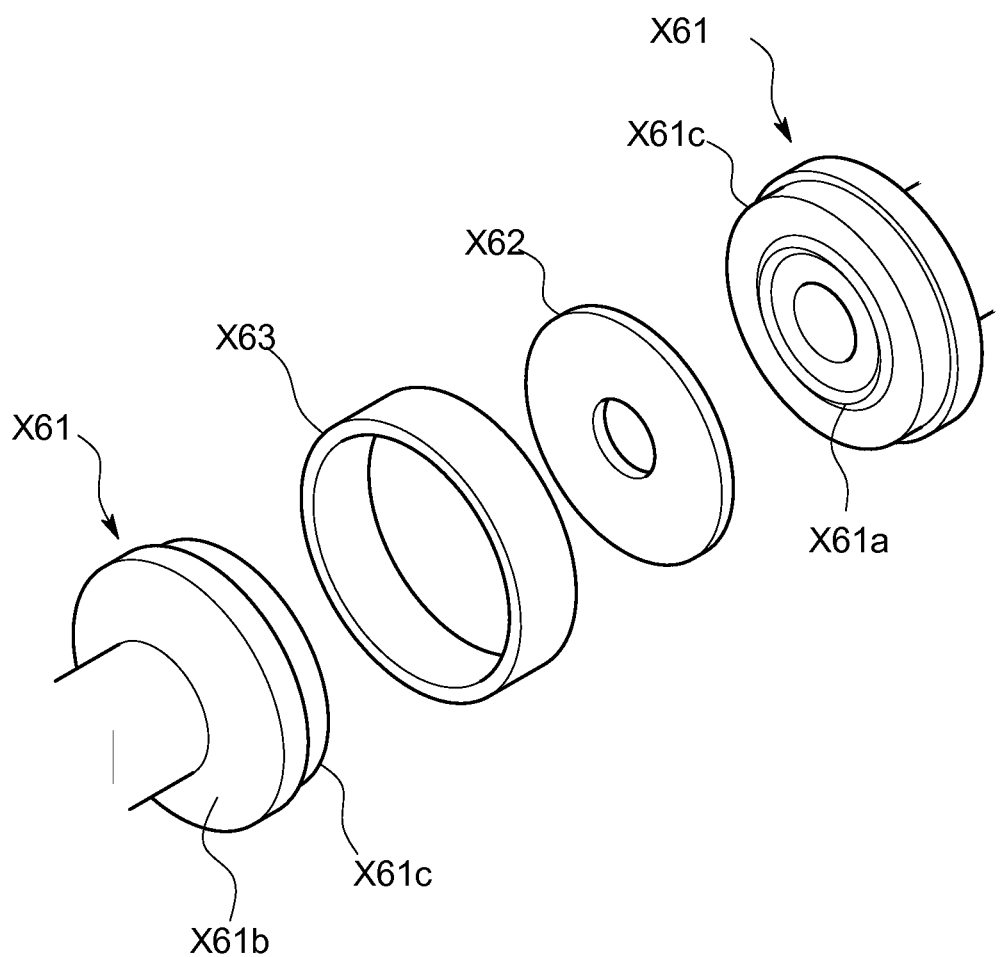
FIG. 18 is an exploded perspective view showing a positioning ring and the like in the embodiment.

As shown in FIG. 18 and the like, the flange part X61 is formed in a circular plate shape, and a convex streak X61a formed in a closed circular shape is provided at the end surface (hereinafter referred to as a lower opposed surface). In addition, an inclined surface X61b inclining in a direction where the diameter is increased toward the end is formed at the reverse surface, and steps are formed in the end portion X61c in the peripheral surface, and thus the external diameter of the end portion X61c is configured to be smaller than other portions.

As shown in FIG. 18 and the like, the gasket X62 is formed in a thin constant-thickness circular plate shape whose internal diameter is the same as the internal diameter of the pipe and whose external diameter is the same as an external diameter of the flange part end portion X61c.

As shown in FIG. 18 and the like, the positioning ring X63 is formed in a cylindrical shape, and is configured by using an elastically-deformable metal. And, the internal diameter of the positioning ring X63 is conformed to the external diameter of the end portion X61c so as to be externally fitted to the flange part end portion X61c free from an extra clearance.

Figure 19:
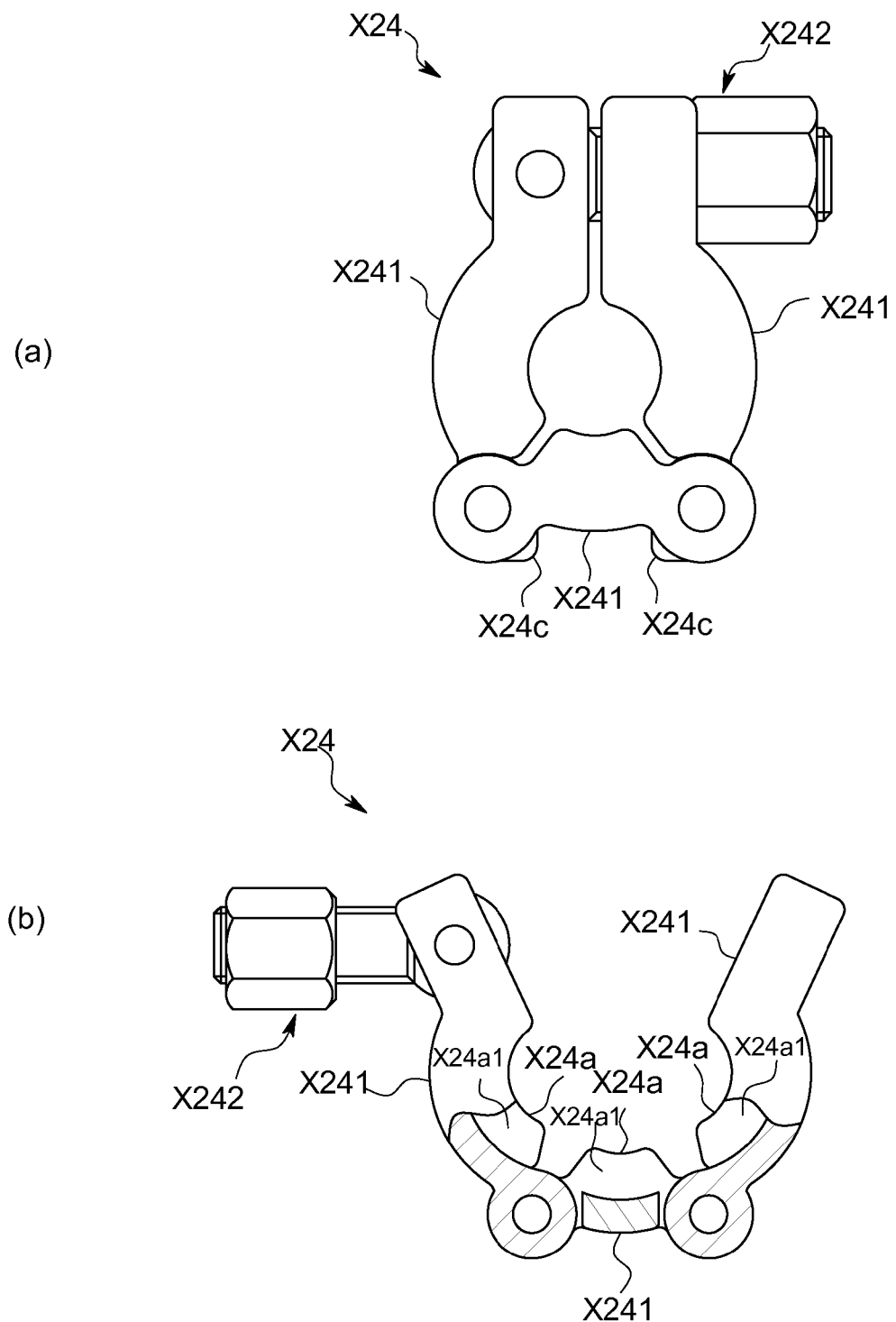
FIG. 19 is a configuration view viewing a coupling ring from an axial direction in the embodiment.
Figure 20:
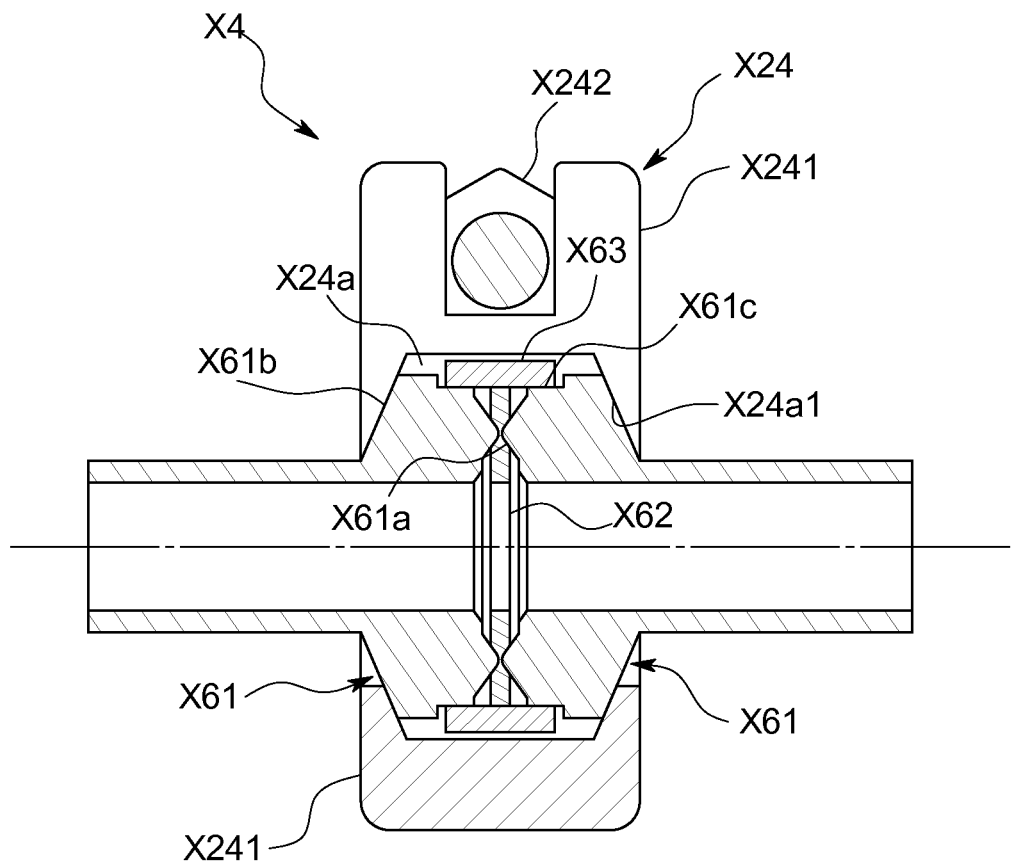
FIG. 20 is a vertical cross-section view of the pipe joint in the embodiment.

As shown in FIG. 19 and so on, the coupling ring X24 includes: a string of ring parts X241 rotatably connected to the adjacent ring parts each other; and a fastener X242 for connecting the ring parts X241 at the both ends to be in a circular shape. A bottom fitting groove X24a extending to a circumferential direction is provided to inner circumferential surfaces of the respective ring parts X241 (three parts here). And, an inclined surface X24a1 corresponding to the inclined surface X61b formed on the reverse surface of the flange part X61 is formed on a side surface of the fitting groove X24a.

In connecting the pipes to each other by using the pipe joint X4, one end portion of the positioning ring X63 is externally fitted to the flange part end portion X61c provided to one of the pipes to be connected at first. Next, the gasket X62 and the flange part end portion X61c provided to the other one of the pipes are fitted in this order to the other end portion of the positioning ring X63 in the axial direction. As the result, the respective flange parts X61, the gasket X62, and the respective pipes are retained with their central axis conformed.

After that, a part of the opposed and close flange parts X61 are wrapped by the coupling ring X24 set to be in an opening state where the ring parts X241 on both ends are not connected, and the fitting groove X24a is fitted to the peripheral rim part of the flange part X61. And, the ring parts X241 on both ends of the coupling ring X24 are coupled and fastened by the fastener X242. In this manner, the internal diameter of the coupling ring X24 is reduced, and accordingly the side surface inclined surface X24a1 of the fitting groove X24a presses the reverse surface inclined surfaces X61b of the respective flange parts X61 in the diameter direction. On this occasion, a component force to move the respective flange parts X61 in a direction approaching the axial direction is generated by the inclined surface X61b, the flange parts X61 are compressed to each other while the circular convex streak X61a is thrust into the gasket X62 by the component force, and thus the pipes are connected to each other in an air-tight state.

Meanwhile, in the present embodiment, since an interval between the insert holes X21 is configured in accordance with an interval between the fluid apparatuses X5, the pedestal members X1 of the fluid apparatuses X5 connected to each other may be inserted into the insert hole X21 at one time after the line has been preliminarily formed by connecting the fluid apparatuses X5 with the pipes.

Accordingly, since being directly under the insert holes X21 in this state, the pedestal main body X12 will escape upward if left in this state. Then, as shown in FIGS. 11(c) and 10(a), the fluid apparatus X5 is moved along the penetrating groove X20, rolling the caster X14 so that the pedestal main body X12 can be positioned below the penetrating groove X20. On this occasion, all the pedestal main bodies X12 are not necessarily positioned below the penetrating grooves 20, and it is required that at least one of the pedestal members X1 is positioned below the penetrating groove X20.

The bolt X30 is fastened in this state, thereby operating the biasing mechanism X3. Then the rail member X2 withstands the force of the spring X23 to move downward, and accordingly the lower surface X2a adjacent to the penetrating groove X20 presses downward on the pressed surface X13a that is the upper surface of the pedestal main body X12. In this manner, the pedestal main body X12 is sandwiched and fixed between the rail member X2 and the base X22 (FIG. 10(b)).

On this occasion, since the surface X22a of the base X22 is formed of the elastic plate, the lower portion of the pedestal main body X12 thrusts into the elastic plate, and thus the pedestal member X1 is fixed so as not to move.

When the fluid apparatus X5 is detached, the process is carried out in a reverse procedure.

According to the fluid apparatus fixation device X100 of the above-mentioned configuration, the fluid apparatus X5 can be easily attached and detached, a group of the fluid apparatuses X5 can be easily changed and added, and a position of the fluid apparatus X5 can be adjusted for the pipe connection in both of the respective fluid apparatuses X5 and all of the plurality of fluid apparatuses X5.

Additionally, since the interval of the insert holes X21 is configured in accordance with the interval between the fluid apparatuses X5, the fluid apparatus X5 can be attached by inserting the pedestal members X1 of the plurality of fluid apparatuses X5 connected by the pipes into the insert holes X21 at one time.

In addition, the change of one fluid apparatus X5 also can be easily carried out. The rail member X2 is lifted after the bolt 30 has been loosened, a state where the fluid apparatus X5 can move in the direction of extension of the penetrating groove X20 is prepared, and then the pipe joint X4 of the fluid apparatus X5 to be changed is detached. After that, as shown in FIG. 12(a), both the adjoining fluid apparatuses X5 are slightly moved toward the outside, and the fluid apparatus X5 to be changed is withdrawn from the insert hole X21.

Then, another fluid apparatus X5 is inserted from the insert hole X21, and is connected to the pipes by pulling the adjoining fluid apparatuses X5. After that, as shown in FIG. 12 (b), the fluid apparatus X5 is moved along the penetrating groove X20 so that the pedestal main body X12 can be positioned below the penetrating groove X20, the bolt X30 is fastened, and accordingly the pedestal main body X12 is fixed.

Figure 12:
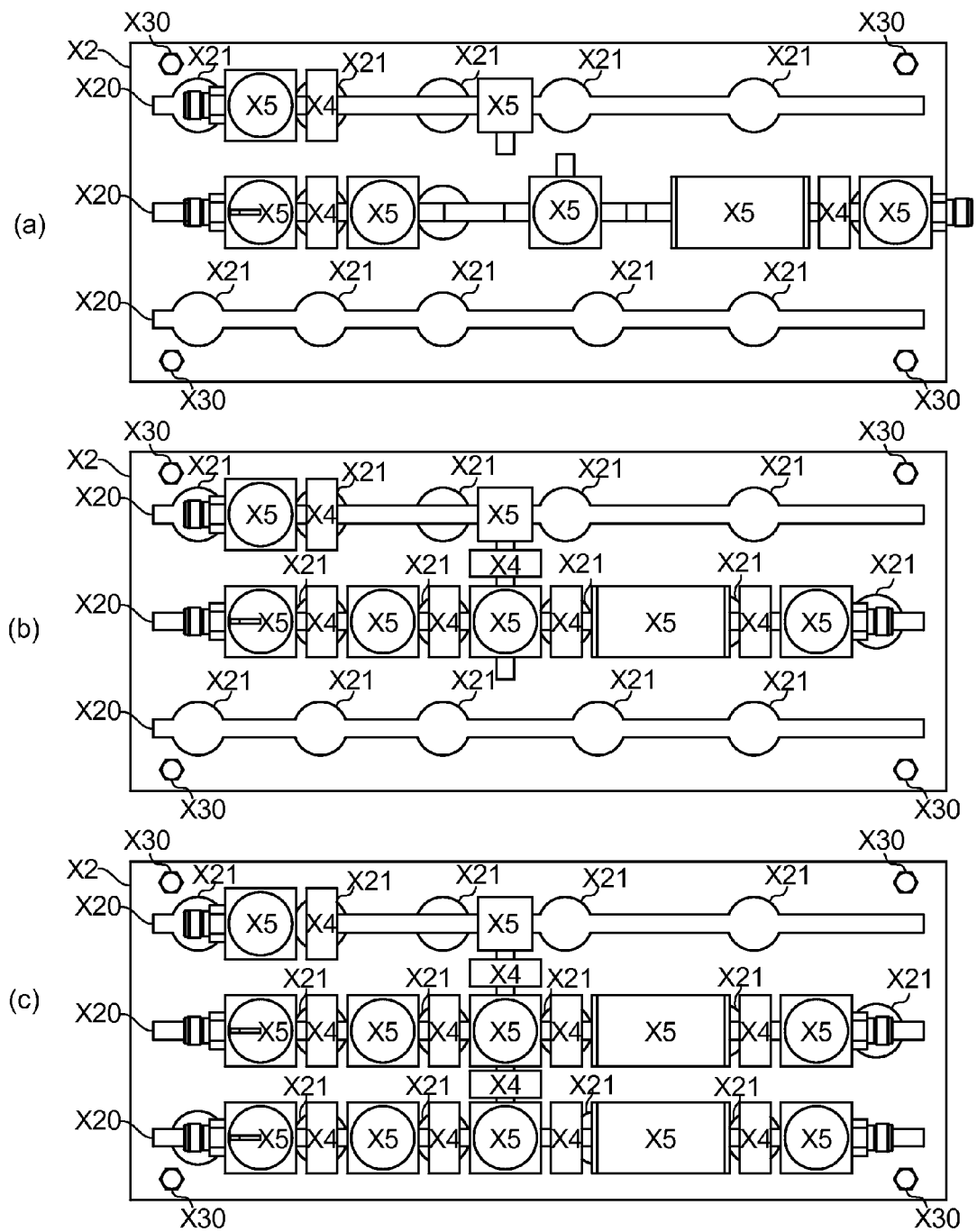
FIG. 12 is a diagram showing a procedure for changing and adding the fluid apparatus by using the fluid apparatus fixation device in the embodiment.

Moreover, as shown in FIG. 12 (c), the fluid apparatus X5 also can be easily added in the same manner.

Figure 13:
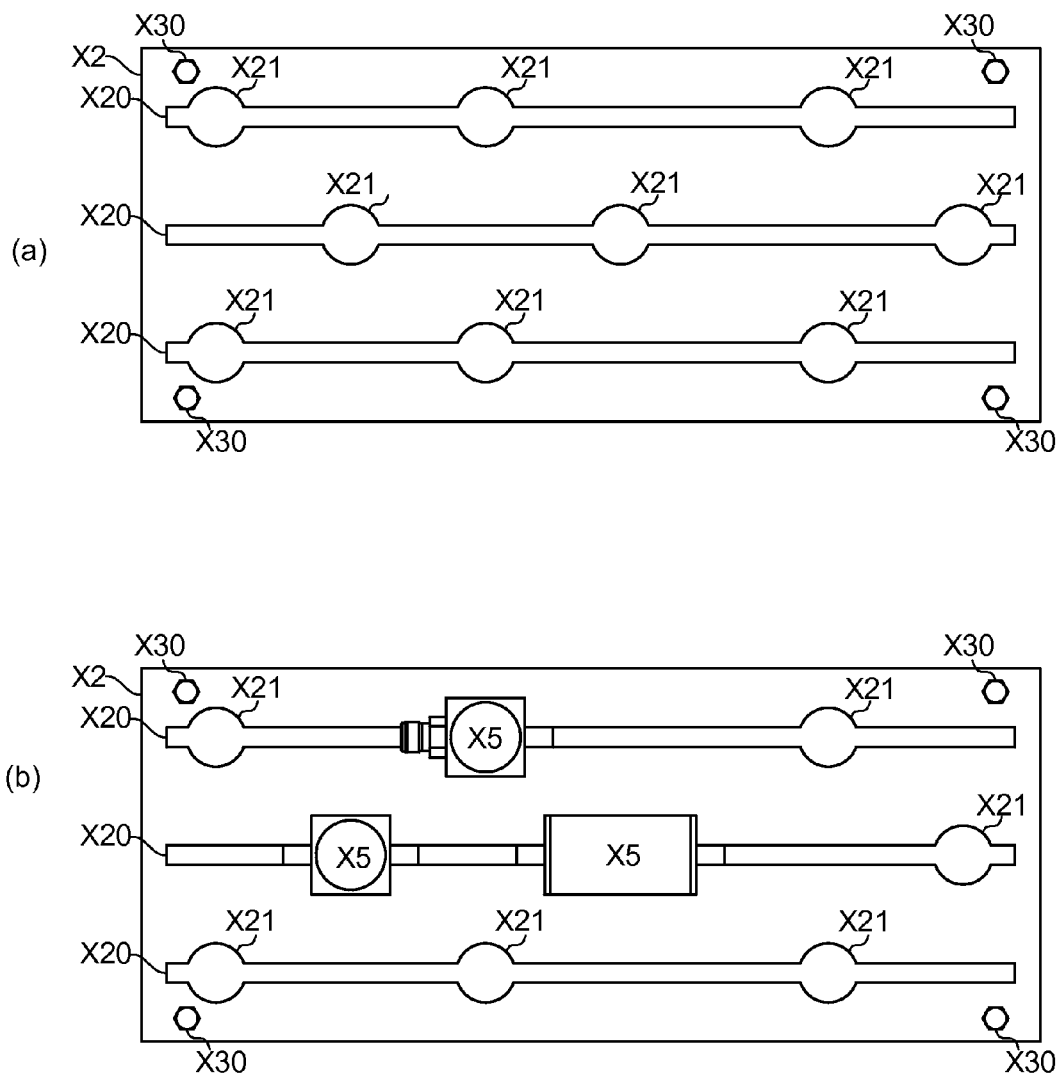
FIG. 13 is a diagram showing a procedure for fixing the fluid apparatus by using the fluid apparatus fixation device in another embodiment.
Figure 14:
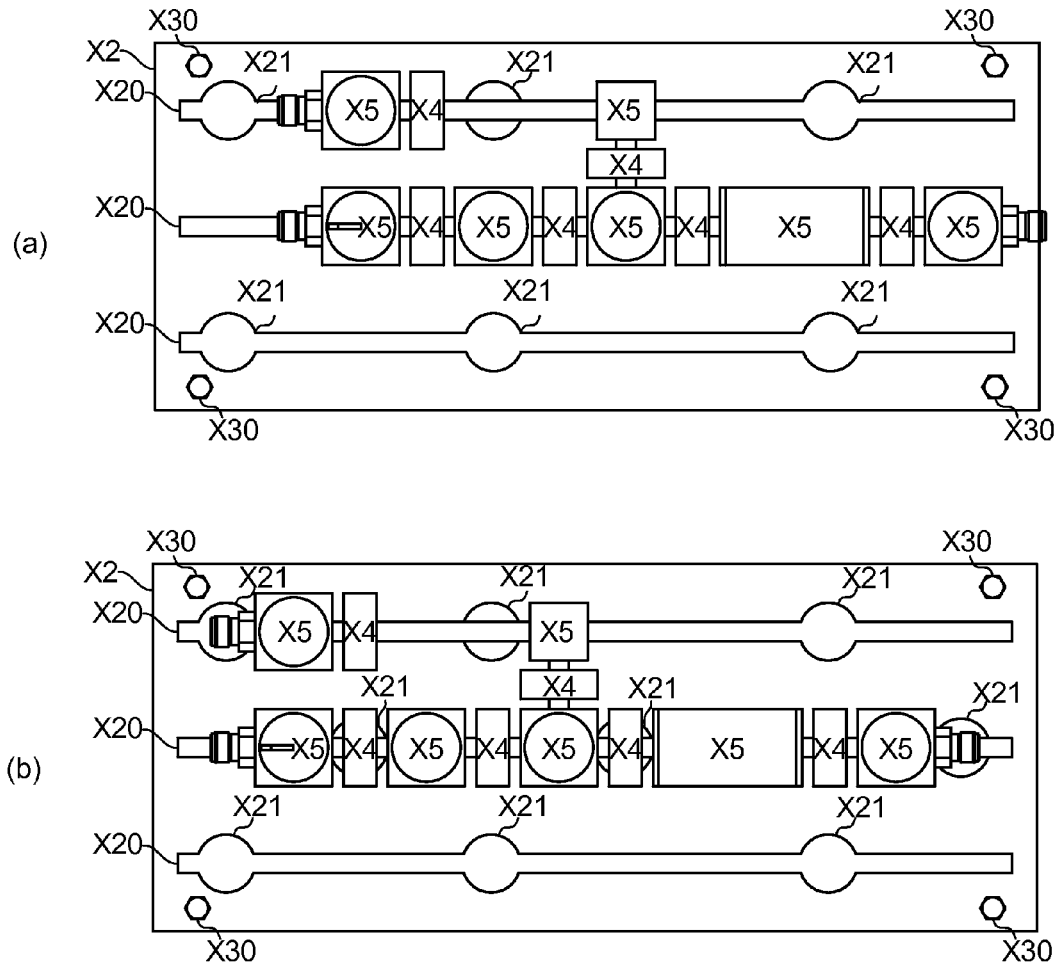
FIG. 14 is a diagram showing a procedure for fixing the fluid apparatus by using the fluid apparatus fixation device in another embodiment.

Meanwhile, the present invention is not limited to the embodiment. For example, as shown in FIG. 13(a), the number of the insert holes X21 is not necessarily required to be the same as that of the fluid apparatuses X5, and additionally is not required to be associated with a connection interval of the fluid apparatuses X5. A method of the attaching and detaching of a case where the number of the insert holes X21 is smaller than that of the fluid apparatuses X5 will be explained below. That is, the bolt X30 is firstly loosened, the pedestal member X1 attached to the bottom portion of the fluid apparatus X5 is, as shown in FIG. 13(b), inserted to the insert hole X21 from above in the state where the rail member X2 is lifted upward, and is moved along the penetrating groove X20. Next, as shown in FIG. 14(a), other fluid apparatuses X5 are inserted to the insert holes X21 in turn, and are connected with the pipes by pulling the adjoining fluid apparatuses X5, respectively. After that, as shown in FIG. 14(b), when the fluid apparatus X5 is moved so that the pedestal main body X12 can be positioned below the penetrating groove X20 and the bolt X30 is fastened, the pedestal member X1 is fixed.

Figure 15:
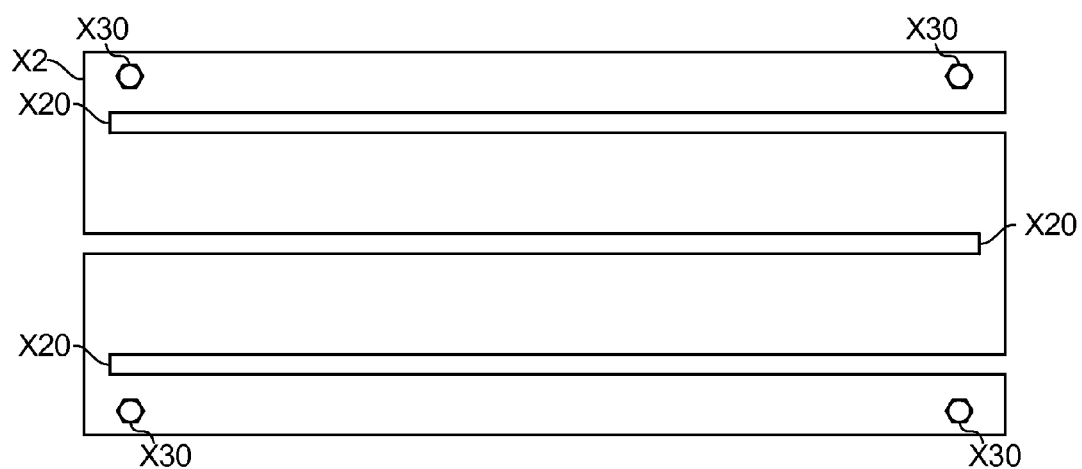
FIG. 15 is a diagram showing a fluid apparatus fixation device in further another embodiment.

In addition, the insert hole X21 does not necessarily need to be provided. In this case, as shown by one example in FIG. 15, the penetrating groove X20 needs to be extended to an end surface of the rail member X2.

In addition, the penetrating grooves X20 are not required to be a plurality of rectangular parallelepiped shapes that are substantially parallel with each other, and the plurality of penetrating grooves X20 may be provided to be orthogonal or intersected so as be continued and the penetrating groove X20 may be provided to be C-shaped, L-shaped, and cross-shaped.

The rail member moves in the vertical direction, but may move in an obliquely downward direction, an obliquely upward direction, and the like. That is, it is required to move at least in the vertical direction.

Moreover, the caster is not necessarily required, and the pedestal main body may be a rectangular parallelepiped member and the like.

It is not required to attach the pedestal member on the bottom surfaces of all fluid apparatuses, but is required to attach the pedestal member on at least one of the plurality of fluid apparatuses. In addition, one or more pedestal members may be provided on the fluid apparatus.

In addition, in a case where the connection intervals between the fluid apparatuses are varied respectively, by employing one connection interval as a reference connection interval, one or more pedestal members may be provided to the respective fluid apparatuses in each reference connection interval. Moreover, the insert hole may be provided in an equal interval in each reference connection interval. In the above-mentioned configuration, the pedestal members of the plurality of fluid apparatuses connected to each other can be inserted to the insert holes and be withdrawn at one time although not from the insert holes corresponding to the respective fluid apparatuses.

In the present embodiment, of the respective surface of the fluid apparatus, the pedestal member is attached on the bottom surface that is a surface facing the base, but may be attached via a bracket member and the like to the respective surfaces such as a side surface, a ceiling surface, and the like of the fluid apparatus.

Figure 16:
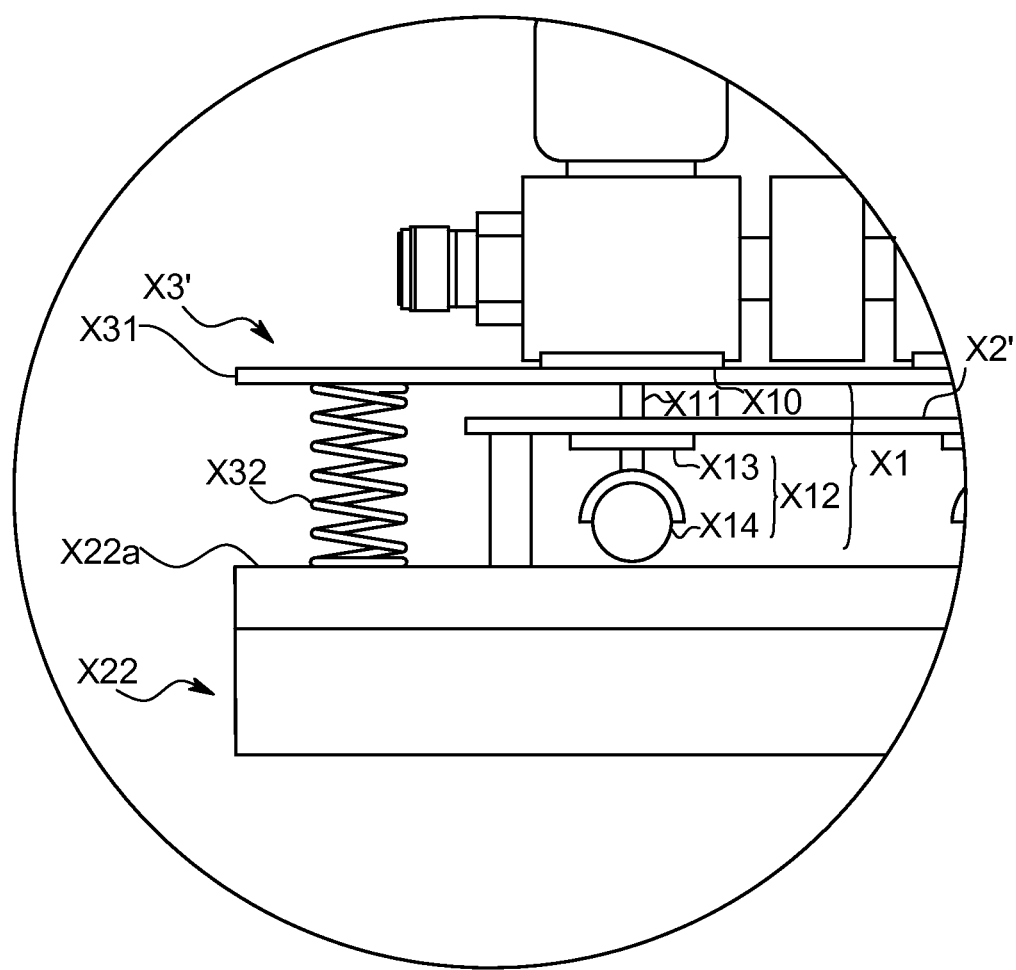
FIG. 16 is a diagram showing a fluid apparatus fixation device in further another embodiment.

A configuration where the rail member does not move in the vertical direction and where the pedestal main body is sandwiched to be fixed between the base and the rail member by extending and shortening may be employed. In addition, as shown in FIG. 16, a configuration where the rail member X2' does not move in the vertical direction and where when the biasing mechanism X3' having the biasing member X31 and the spring X32 biases upward the bracket member X10 of the pedestal member X1, the pedestal main body X12 and the rail member X2' are pressed to fix the pedestal member X1 may be employed.

Additionally, the present invention may be configured by combining the respective configurations, and can be variously modified within the scope of the invention.

REFERENCE CHARACTERS LIST

100 Fluid device
11, 12, 13 Fluid apparatus
4, 4', 4" Pipe
L1 Vertical fluid line (gas supply line)
L2 Horizontal fluid line (cleaning gas supply line)
L3 Horizontal fluid line (outlet collective line)
2 Flange joint
21 Flange part
21b Inclined surface
24 Coupling ring
61, 62 Joint pipe
X100 Fluid apparatus fixation device
X1 Pedestal member
X10 Bracket member
X11 Neck member
X12 Pedestal main body
X13 Body
X13a Pressed surface
X14 Caster
X2 Rail member
X2a Lower surface of rail member
X20 Penetrating groove
X21 Insert hole
X22 Base
X22a Surface of base
X23 Spring
X3 Biasing mechanism
X30 Bolt
X4 Pipe joint
X5 Fluid apparatus

The invention claimed is:

1. A fluid device comprising: a plurality of vertical fluid lines, each vertical fluid line having one or more fluid apparatuses and pipes that are connected in series; and a plurality of horizontal fluid lines, each horizontal fluid line having one or more series-connected pipes, wherein the plurality of vertical fluid lines are arranged to be fluidically parallel to each other, and wherein between any two adjoining vertical fluid lines, the plurality of horizontal fluid lines for connecting them are arranged to be fluidically parallel;

wherein one of the plurality of horizontal fluid lines is arranged between pipes of the adjoining vertical fluid lines and includes a plurality of series-connected pipes, each having a flange part at an adjoining end portion, and a coupling member for connecting the adjoining flange parts;

wherein each coupling member and its adjoining flange parts connect a horizontal fluid line to a vertical fluid line and constitute a flange joint;

wherein another one of the plurality of fluidically parallel horizontal fluid lines is arranged between the pipes of the adjoining vertical fluid lines and includes a pipe connected to the pipes of the vertical fluid lines by flexible joint pipes that are structurally elongated in an axial flow direction and different from the flange part and the coupling member;

wherein each one of the plurality of vertical fluid lines includes a plurality of series-connected pipes that are connected to a respective one of the flexible joint pipes connecting a pipe of one of the horizontal fluid lines to a pipe of the one of the vertical fluid lines, and that are also connected to a respective one of the flange joints;

wherein each flange joint is vertically spaced apart from each flexible joint pipe and connected by a vertical pipe to the flexible joint pipe; and wherein the flexibility of the flexible joint pipe enables the vertical lines at the flexible joint pipes to absorb changes in pipe dimension and accommodate misalignment at the flexible joint pipes.

2. The fluid device according to claim 1, wherein the one of the plurality of horizontal fluid lines that includes the pipe connected to the pipes of the vertical fluid lines by flexible joint pipes is positioned on an endmost side of the fluid device.

3. A fluid device comprising: a plurality of vertical fluid lines, each vertical fluid line having one or more fluid apparatuses and pipes that are connected in series; and a plurality of horizontal fluid lines, each horizontal fluid line having one or more series-connected pipes, wherein the plurality of vertical fluid lines are arranged to be fluidically parallel to each other, and wherein between any two adjoining vertical fluid lines, the plurality of horizontal fluid lines for connecting them are arranged to be fluidically parallel;

wherein one of the plurality of horizontal fluid lines is arranged between pipes of the adjoining vertical fluid lines and includes a plurality of series-connected pipes, each having a flange part at an adjoining end portion, and a coupling member for connecting the adjoining flange parts;

wherein each coupling member and its adjoining flange parts connect a horizontal fluid line to a vertical fluid line and constitute a flange joint;

wherein another one of the plurality of fluidically parallel horizontal fluid lines is arranged between the pipes of the adjoining vertical fluid lines and includes a pipe connected to the pipes of the vertical fluid lines by flexible joint pipes that are structurally elongated and different from the flange part and the coupling member;

wherein each one of the plurality of vertical fluid lines includes a plurality of series-connected pipes that are connected to a respective one of the flexible joint pipes connecting a pipe of one of the horizontal fluid lines to a pipe of the one of the vertical fluid lines, and that are also connected to a respective one of the flange joints;

wherein each flange joint is vertically spaced apart from each flexible joint pipe and connected by a vertical pipe to the flexible joint pipe; and wherein the flexibility of the flexible joint pipe enables the vertical lines at the flexible joint pipes to absorb changes in pipe dimension and accommodate misalignment at the flexible joint pipes, wherein the pipes of the fluid lines are fitted and welded to flexible joint pipes to connect the pipes of the fluid lines to each other in an air-tight state.

4. A fluid device comprising: a plurality of vertical fluid lines, each vertical fluid line having one or more fluid apparatuses and pipes that are connected in series; and a plurality of horizontal fluid lines, each horizontal fluid line having one or more series-connected pipes, wherein the plurality of vertical fluid lines are arranged to be fluidically parallel to each other, and wherein between any two adjoining vertical fluid lines, the plurality of horizontal fluid lines for connecting them are arranged to be fluidically parallel;

wherein one of the plurality of horizontal fluid lines is arranged between pipes of the adjoining vertical fluid lines and includes a plurality of series-connected pipes, each having a flange part at an adjoining end portion, and a coupling member for connecting the adjoining flange parts;

wherein each coupling member and its adjoining flange parts connect a horizontal fluid line to a vertical fluid line and constitute a flange joint;

wherein another one of the plurality of fluidically parallel horizontal fluid lines is arranged between the pipes of the adjoining vertical fluid lines and includes a pipe connected to the pipes of the vertical fluid lines by flexible joint pipes that are structurally elongated and different from the flange part and the coupling member;

wherein each one of the plurality of vertical fluid lines includes a plurality of series-connected pipes that are connected to a respective one of the flexible joint pipes connecting a pipe of one of the horizontal fluid lines to a pipe of the one of the vertical fluid lines, and that are also connected to a respective one of the flange joints;

wherein each flange joint is vertically spaced apart from each flexible joint pipe and connected by a vertical pipe to the flexible joint pipe; and wherein the flexibility of the flexible joint pipe enables the vertical lines at the flexible joint pipes to absorb changes in pipe dimension and accommodate misalignment at the flexible joint pipes, wherein the flexible joint pipe is an elbow type.

5. A fluid device comprising: a plurality of vertical fluid lines, each vertical fluid line having one or more fluid apparatuses and pipes that are connected in series; and a plurality of horizontal fluid lines, each horizontal fluid line having one or more series-connected pipes, wherein the plurality of vertical fluid lines are arranged to be fluidically parallel to each other, and wherein between any two adjoining vertical fluid lines, the plurality of horizontal fluid lines for connecting them are arranged to be fluidically parallel;

wherein one of the plurality of horizontal fluid lines is arranged between pipes of the adjoining vertical fluid lines and includes a plurality of series-connected pipes, each having a flange part at an adjoining end portion, and a coupling member for connecting the adjoining flange parts;

wherein each coupling member and its adjoining flange parts connect a horizontal fluid line to a vertical fluid line and constitute a flange joint;

wherein another one of the plurality of fluidically parallel horizontal fluid lines is arranged between the pipes of the adjoining vertical fluid lines and includes a pipe connected to the pipes of the vertical fluid lines by flexible joint pipes that are structurally elongated and different from the flange part and the coupling member;

wherein each one of the plurality of vertical fluid lines includes a plurality of series-connected pipes that are connected to a respective one of the flexible joint pipes connecting a pipe of one of the horizontal fluid lines to a pipe of the one of the vertical fluid lines, and that are also connected to a respective one of the flange joints;

wherein each flange joint is vertically spaced apart from each flexible joint pipe and connected by a vertical pipe to the flexible joint pipe; and wherein the flexibility of the flexible joint pipe enables the vertical lines at the flexible joint pipes to absorb changes in pipe dimension and accommodate misalignment at the flexible joint pipes, wherein the flexible joint pipe is a T-shape type.

* * * * *